Oct. 11, 1966  F. S. SAUNDERS ETAL  3,278,925
CRANES

Filed March 9, 1964  4 Sheets-Sheet 1

INVENTORS
Frank S. Saunders
Brian G. Nixon

By Watson, Cole, Grindle & Watson
ATTORNEYS

Oct. 11, 1966   F. S. SAUNDERS ETAL   3,278,925
CRANES
Filed March 9, 1964   4 Sheets-Sheet 2

INVENTORS
Frank S. Saunders
Brian G. Nixon
By Watson, Cole, Grindle & Watson
ATTORNEYS 3,278,925
CRANES
Frank Stanley Saunders, Storrington, Sussex, and Brian George Nixon, Kew Gardens, Surrey, England, assignors to Weighload Limited, London, England, a British company
Filed Mar. 9, 1964, Ser. No. 350,494
4 Claims. (Cl. 340—267)

It is necessary to make sure that the tipping load exerted by the weight suspended from the jib of a luffing crane does not overpower the counterbalance and cause the crane to tip on its base or its wheeled or tracked carriage. The invention aims to provide a warning device for indicating to the operator when such a crane becomes overloaded either by lifting an excessive load or as the result of the working radius being increased to a dangerous degree with a load suspended from the jib.

The invention accordingly provides an overload warning device for a luffing crane comprising a device for measuring the load suspended by the jib of the crane, a first indicating member controlled by the load measuring device and arranged to move progressively from one end of an indicating path in response to increase in the load, a device for measuring the working radius of the crane, a second indicating member controlled by the radius measuring device and arranged to move progressively from the other end of the indicating path in response to increase in the working radius to positions in the path indicative of the safe load at any particular working radius, and means for issuing a warning signal upon coincidence of the two indicating members.

Preferably the indicating members are pointers movable from opposite ends of a scale graduated to show the load suspended from the jib.

The warning device may include means for issuing a second warning signal after the two pointers have passed and moved apart to an extent representing a predetermined percentage of safe working load.

In the embodiment of the invention hereinafter described in more detail the load measuring device is a dynamometer arranged to measure the load in the lifting rope of the crane and the radius measuring device comprises a slave jib for duplicating the angular position of the jib of the crane, a slide arranged to move linearly in response to angular movement of the slave jib, an angularly movable member geared to the radius responsive pointer and a pin and cam track interconnecting the slide and the angularly movable member and arranged to impart angular movement to said member in response to linear movement of the slide.

Figure 1:
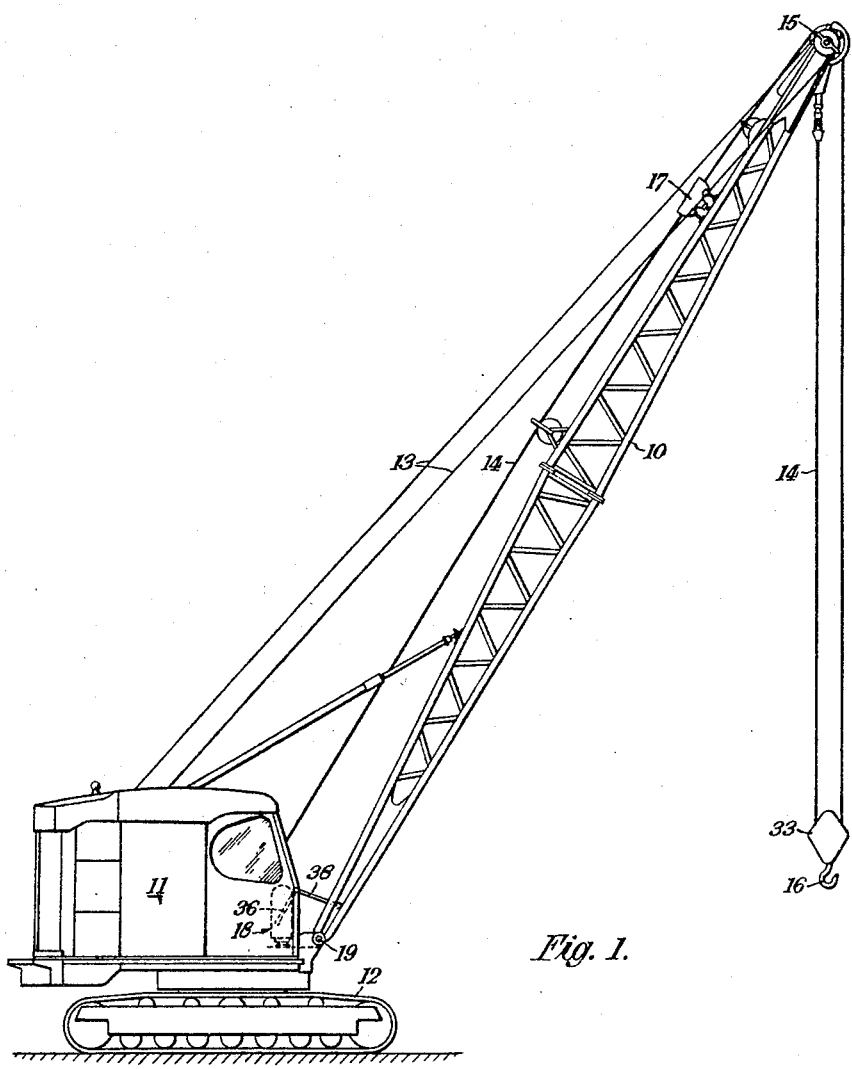
Figure 2:
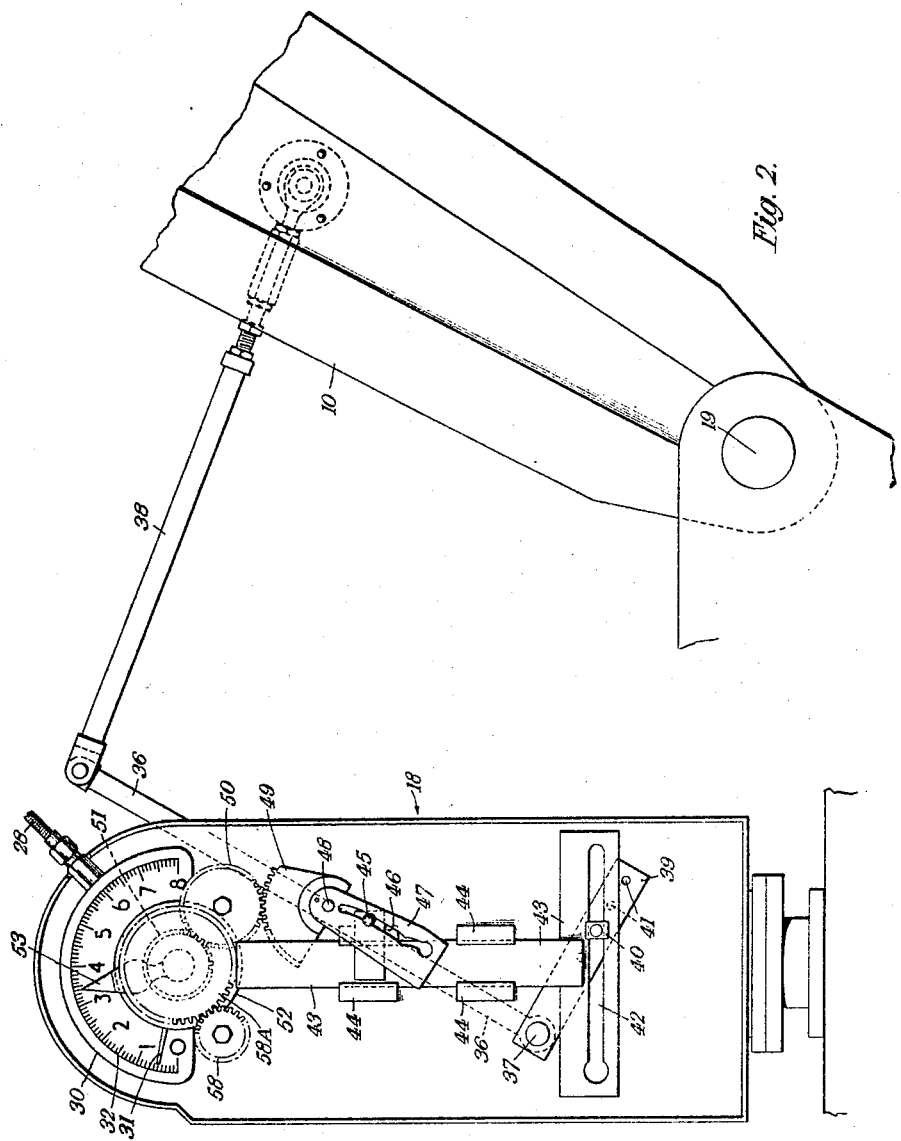
Figure 3:
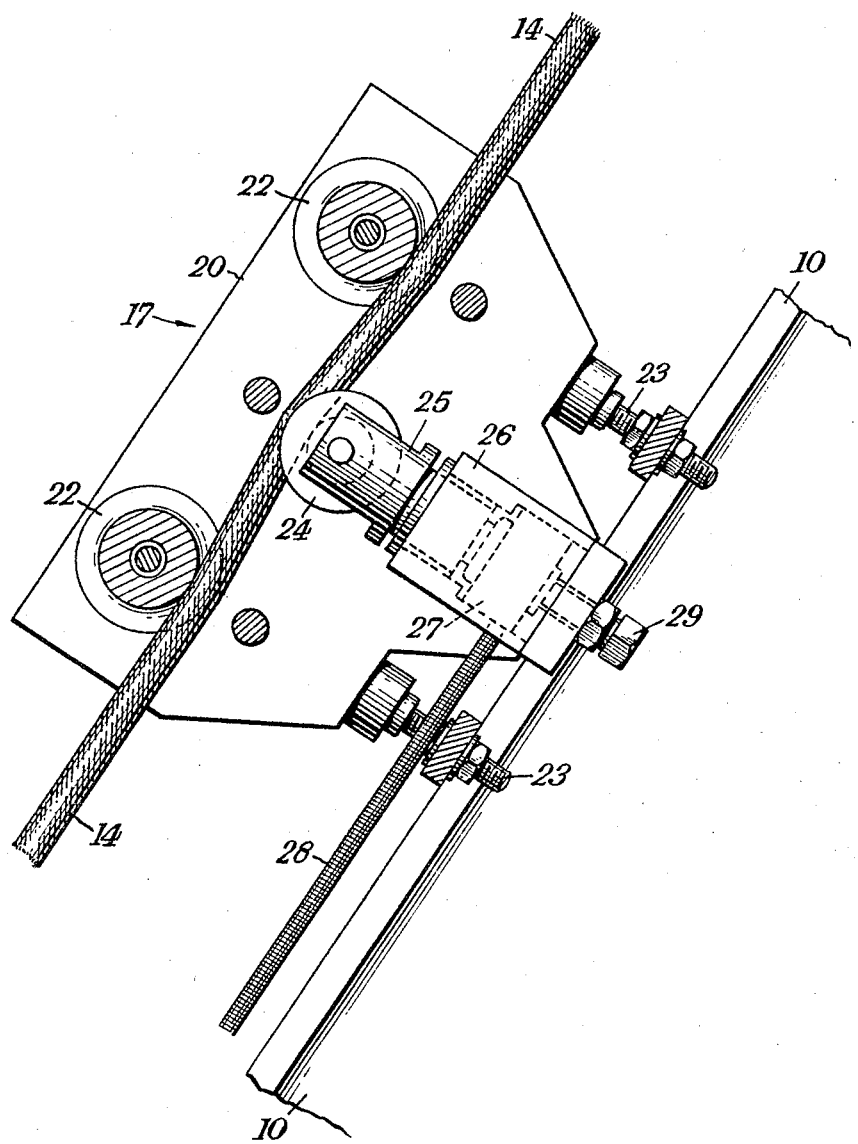
Figure 4:
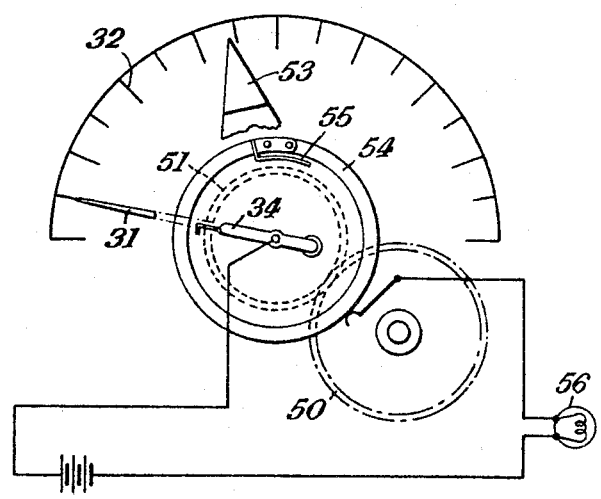
Figure 5:
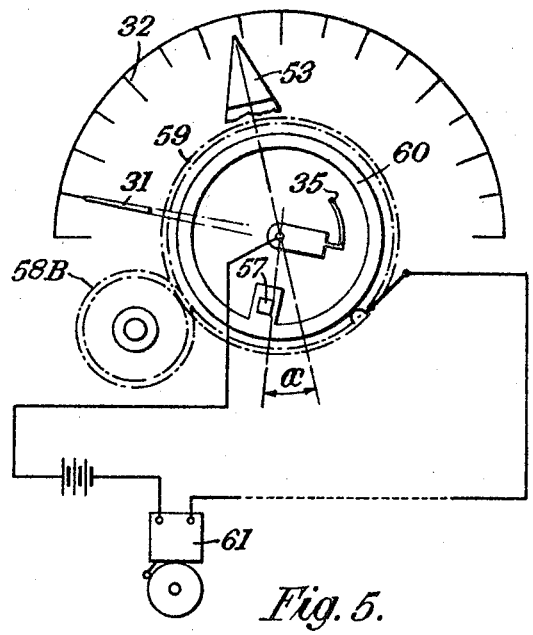

One embodiment of overload device in accordance with the invention will now be described in more detail, by way of example, with reference to the accompanying drawings, in which FIG. 1 is a side elevation of a mobile luffing crane,
FIG. 2 is a side elevation, on a larger scale, of a control box which is housed within the cabin of the crane,
FIG. 3 is a side elevation of the dynamometer and
FIGS. 4 and 5 are diagrams showing respectively the visual and audible warning systems.

The crane (FIG. 1) includes a jib 10 and a cabin 11 mounted on a tracked carriage 12. The luffing ropes are indicated at 13 and the hoisting rope 14 extends over a pulley 15 at the top of the jib to a hook 16. A dynamometer 17 is provided on the jib for measuring the load suspended from the hook and a control box 18 is provided within the cabin near the point 19 of the jib.

The dynamometer 17 (FIG. 3) comprises a framework carrying a pair of rollers 22. The lifting rope 14 passes over a roller 24 and under the rollers 22 as shown and screws 23 are provided for adjusting the framework in relation to the jib 10 so that the framework extends approximately parallel to the rope 14. The roller 24 is mounted on a slide 25, which is movable in a guide 26 in a direction at right angles to the length of the rope 14. The inner end of the slide 25 bears against a hydrostatic load cell 27 of the construction described in British specification No. 564,287 and the rope accordingly imposes on the load cell 27 a force which is proportional to the load suspended from the rope 14 by the hook 16. The ratio between the suspended load and the hydrostatic pressure generated by the load cell 27 in a pipe line 28 can be adjusted by a screw 29 which alters the above-mentioned ratio. The pipe line 28 communicates with a pressure gauge 30 (FIG. 2) and the pointer 31 of the pressure gauge, which is actuated by a Bourdon tube responsive to the pressure in the pipe line 28 and gearing (not shown), moves over a scale 32 calibrated in terms of the actual load suspended from the rope 14. The pointer 31 moves clockwise as shown in FIG. 2 as the suspended load increases. In FIG. 1, the rope 14 is shown with a two part reeve around the hook block 33, with the result that the load in the rope 14 is half the suspended load. If the number of reeves at the hook block is changed, a corresponding adjustment of the dynamometer ratio is made by means of the adjusting screw 29 (FIG. 3) so as to maintain the same overall ratio between the suspended load and the pressure in the pipe line 28. Two contacts are attached to and move with the pointer 31, one contact 34 (FIG. 4) serving to give a visual overload warning and the other contact 35 (FIG. 5) serving to give an audible overload warning, as later explained.

The control box 18 (FIG. 2) includes a slave jib 36 movable about a pivot 37 and connected to the jib 10 by an arm 38 so that it moves with the jib 10 and maintains the same angular position as the jib. An arm 39 extends at right angles to the slave jib 36 and moves around the pivot 37 in unison with the slave jib. The arm 39 carries a slide block 40, which is positioned at a distance from the pivot 37 which is a predetermined fraction of the length of the jib 10, e.g., 4 inches for a 40 ft. jib, providing a 1:120 ratio. The slide block 40 can be fitted into alternative holes 41 in the arm 39 to provide for variations in the length of the jib.

The slide block 40 engages a slot 42 in a T slide 43 which is guided for vertical movement in guides 44. Angular movement of the jib 10 will accordingly result in vertical movement of the T slide 43, to an extent determined by the above mentioned ratio of 1:120, i.e. movement of the T slide 43 will be 1 inch for a change in jib radius of 10 feet. The T slide 43 carries a roller 45, which engages a cam slot 46 in an arm 47 rotatable about a pivot 48 and fixed to a gear wheel 49, which meshes with a gear wheel 50. The gear wheel 50 meshes in turn with a gear wheel 51 disposed in a casing 52 and fixed to a pointer 53. The casing 52 contains the electrical contacts and slip rings which are described later and are shown in FIGS. 4 and 5. The pointer 53 moves anticlockwise over the scale 32 as the working radius of the jib increases and the cam slot 46 is so formed that the position of the pointer 53 indicates the load at any working radius of the crane at which a visual warning should be given to the operator. A slip ring 54 (FIG. 4) moves in unison with the pointer 53 and when the pointers 31, 53 come into coincidence, the contact 34 meets a contact 55 on the slip ring and completes a circuit to light a warning lamp 56.

Another electrical contact 57, which is offset angularly from the pointer 53 by an angle $\alpha$ (FIG. 5) which represents a constant percentage of the safe working load, is rotated by a secondary train, comprising a gear wheel 58, driven by a gear wheel 58A fixed to the pointer 53, a gear wheel 58B mounted on the same spindle as the gear wheel 58 and a gear wheel 59. If the working radius is increased after the visual warning has been given, the pointers 31, 53 will pass each other and after the working radius has increased to an extent representing said constant percentage of safe working load, the contacts 35, 57 will meet completing a circuit through a slip ring 60 to ring a bell 61. The warning lamp 56 remains on until the bell 61 has begun to ring, both signals thereafter continuing.

What we claim as our invention and desire to secure by Letters Patent is:

1. An overload warning device for a luffing crane having an angularly movable jib and a lifting rope, comprising a load measuring device for measuring the load on the lifting rope, a first indicating member controlled by the load measuring device and arranged to move progressively from one end of an indicating path in response to increase in said load, a slave jib adapted to move angularly with the jib of the crane to positions representative of the working radius of the crane, an arm extending from the slave jib and arranged to move in unison therewith, a transmission member actuable by the slave jib and arranged to execute a linear movement which is proportional to the angular movement of the slave jib, means for confining the movement of said transmission member to such linear path, means for slidably coupling the transmission member to said arm at different points along the length of the arm corresponding to crane jibs of different length, a cam cooperating with said transmission member for translating the movement of said transmission member to a corresponding movement of said cam, a second indicating member, means operated by said cam for moving the second indicating member progressively from the other end of said indicating path in response to increase in the working radius, said cam being shaped to cause said second indicating member to move to positions in said indicating path indicative of the safe load at any particular working radius of the crane, and means operable by approach of the two indicating members to issue a warning signal when an overload condition is approached.

2. A warning device as claimed in claim 1, in which said arm is formed with a number of spaced holes and in which the means for coupling the transmission member to the arm comprises a slide block which is movable in a slot in said transmission member extending in a direction at right angles to the direction of linear movement of said transmission member and is engageable with a selected one of said holes in the arm.

3. A warning device as claimed in claim 1, in which said indicating path includes an arcuate scale graduated in units of weight to show the load supported from the jib and said indicating members, which respectively indicate load and safe load at a particular working radius, are pointers movable in relation to said scale.

4. A warning device as claimed in claim 3, in which said cam is movable angularly about a pivot and which further includes gearing connecting said cam to the pointer which indicates safe load, and a pin on said transmission member which engages a cam slot in said cam.

References Cited by the Examiner

UNITED STATES PATENTS

| | | | |
|---|---|---|---|
| 1,857,172 | 5/1932 | Wagner | 340—267 |
| 2,022,844 | 1/1935 | Christian | 212—2 |
| 2,030,529 | 2/1936 | Nash. | |
| 2,646,273 | 7/1953 | Wetsel | 212—2 X |
| 3,123,814 | 3/1964 | Aiken | 340—267 |

FOREIGN PATENTS

| | | |
|---|---|---|
| 375,386 | 6/1932 | Great Britain. |
| 378,881 | 8/1932 | Great Britain. |
| 723,070 | 2/1955 | Great Britain. |

NEIL C. READ, *Primary Examiner.*

THOMAS B. HABECKER, *Examiner.*

R. M. GOLDMAN, *Assistant Examiner.*